US009769397B2

United States Patent
Kerbiriou et al.

(10) Patent No.: US 9,769,397 B2
(45) Date of Patent: Sep. 19, 2017

(54) METHOD AND APPARATUS FOR ACQUIRING A SET OF IMAGES ILLUMINATED BY A FLASH

(71) Applicant: THOMSON LICENSING, Issy de Moulineaux (FR)

(72) Inventors: Paul Kerbiriou, Thorigne-Fouillard (FR); Matis Hudon, Epinay sur Orge (FR); Olivier Bureller, Cesson Sevigne (FR)

(73) Assignee: THOMSON LICENSING, Issy les Moulineaux ( * ) Notice: Subject to any disclaimer, the term of this patent is extended or adjusted under 35 U.S.C. 154(b) by 0 days.

(21) Appl. No.: 14/578,242

(22) Filed: Dec. 19, 2014

(65) Prior Publication Data

US 2015/0181139 A1    Jun. 25, 2015

(30) Foreign Application Priority Data

Dec. 19, 2013  (EP) .................................... 13306781

(51) Int. Cl.
  *H04N 5/222*  (2006.01)
  *H04N 5/353*  (2011.01)
  (Continued)

(52) U.S. Cl.
  CPC .......... *H04N 5/353* (2013.01); *H04N 5/2256* (2013.01); *H04N 5/2353* (2013.01);
  (Continued)

(58) Field of Classification Search
  CPC ............ H04N 5/23232; H04N 5/2256; H04N 5/2354; H04N 3/1593; G06K 9/2027; G03B 15/02; G03B 15/04; G03B 9/70
  (Continued)

(56) References Cited

U.S. PATENT DOCUMENTS 7,129,983 B2   10/2006  Rantanen et al.
8,401,378 B2    3/2013  Tsai
(Continued)

FOREIGN PATENT DOCUMENTS

JP   2007135073   5/2007
JP   2013197841   9/2013

OTHER PUBLICATIONS

Bradley etal: "Synchronization and rolling shutter compensation for consumer video camera arrays", computer vision and pattern recongnition workshops, 2009, CVPR workshops 2009. IEEE computer society conference on, IEEE, Jun. 20, 2009, pp. 1-8.
(Continued)

*Primary Examiner* — Kelly L Jerabek
(74) *Attorney, Agent, or Firm* — Tutunjian Bitetto, P.C.

(57) ABSTRACT

An electronic imaging device having a plurality of photosensitive cells arranged in an array to form a frame region, the frame region being composed of a plurality of frame sub-regions each frame sub-region corresponding to a subset of photosensitive cells, the device comprising an array controller configured to expose each of said frame sub-regions during an exposure duration wherein the exposure of at least some of said frame sub-regions occurs at different times during a total time of exposure of the frame region, a flash unit for illuminating a scene to be imaged during a flash time duration an activator for activating the flash unit to illuminate the scene to be imaged at a flash time delay determined in dependence upon said exposure duration of a frame sub region and the flash time duration; an image data acquisition unit for acquiring a set of frames of the scene wherein the time of occurrence of a flash event within a frame shifts temporally from frame to frame; and an image reconstruction unit for constructing a sequence of images from the frame sub-regions of the acquired frames.

19 Claims, 10 Drawing Sheets

(51) Int. Cl.
*H04N 5/235* (2006.01)
*H04N 5/225* (2006.01)
*G03B 15/05* (2006.01)

(52) U.S. Cl.
CPC ......... *H04N 5/2354* (2013.01); *H04N 5/3532* (2013.01); *G03B 15/05* (2013.01); *G03B 2215/0596* (2013.01)

(58) Field of Classification Search
USPC .............. 348/218.1, 296, 362–367, 370–371
See application file for complete search history.

(56) References Cited

U.S. PATENT DOCUMENTS

| | | | |
|---|---|---|---|
| 2006/0238643 A1 | 10/2006 | Liao et al. | |
| 2010/0026853 A1 | 2/2010 | Mokhnatyuk | |
| 2010/0165180 A1* | 7/2010 | Park | H04N 5/2256 348/371 |
| 2010/0171875 A1* | 7/2010 | Yamamoto | G03B 15/03 348/370 |
| 2011/0273591 A1 | 11/2011 | Fukushima | |
| 2013/0044230 A1 | 2/2013 | Zhou | |
| 2013/0208149 A1 | 8/2013 | Kamiya | |
| 2014/0347553 A1* | 11/2014 | Ovsiannikov | H04N 5/2256 348/367 |
| 2015/0002734 A1* | 1/2015 | Lee | H04N 5/2256 348/367 |

OTHER PUBLICATIONS

Lumenera Corporation: "Exposure and strobe delay vs shutter type timing app. note", Mar. 1, 2005, retrieved from the internet: URL: http://www.lumenera.com/support/pdf/LA-2104-ExposureVsShutterTypeTimingAppNote.pdf, *p. 1*; pp. 1-4.

http://www.outsight.com.au/products/creamsource/accessories.php; Nov. 27, 2014; p. 1.

http://en.wikipedia.org/wiki/Rolling_shutter; "Rolling Shutter"; Nov. 27, 2014;pp. 1-3.

Search Report Dated Apr. 16, 2014.

* cited by examiner

A)        B)

METHOD AND APPARATUS FOR ACQUIRING A SET OF IMAGES ILLUMINATED BY A FLASH

This application claims the benefit, under 35 U.S.C. §119 of European Patent Application No. 13306781.9, filed Dec. 19, 2013.

TECHNICAL FIELD

The present invention relates to a method and an apparatus for obtaining a sequence of images illuminated by a flash. Particularly, but not exclusively, the invention relates to a method and device for controlling a flash in a camera equipped with a rolling shutter.

BACKGROUND

Imaging devices based on digital image sensors operate by capturing an optical image and converting it into electronic signals. Such devices are capable of capturing still images and/or a video composed of a sequence of images, often referred to as frames. A digital image sensor typically includes photosensitive cells (often referred to as photosites) arranged in an array of rows and columns. Photosensitive cells used in imaging devices are often based on semiconductor technology, capable of converting photons into electrons, such as, for example, charge coupled devices (CCD) or complementary metal oxide technology (CMOS). Such imaging sensor devices have wide ranging applications ranging from professional film studio cameras to consumer devices including dedicated imaging devices such as camcorder cameras as well as personal electronic devices with built in imaging functions, such as mobile telephones, smart telephones, personal digital assistants (PDA), and portable computers including tablet computers, laptop computers, notebook computers, and the like.

Imaging devices based on CCD technology typically employ a global shutter technique in which an entire array of photosensitive cells is exposed at the same time to capture a frame of image data. Imagers based on CMOS technology, on the other hand, typically employ a "rolling shutter" technique to capture a frame. In this so called "rolling shutter" technique the scan lines (for example, rows or columns) of the sensor array are each exposed at different times, and read out from the photosensitive cells is performed sequentially line by line (for example, from the top row of the sensor array to the bottom row of the sensor array). The read outs from the lines of photosensitive cells are then merged together to form a single image.

When an object to be imaged is fixed with respect to the imaging device, or is slow moving with respect to the processing time of all the lines, the rolling shutter has no significant effect on image quality. If the lighting conditions are constant with respect to the processing time, again the rolling shutter has no significant effect on image quality. However, in scenarios where an object is fast moving and/or the lighting conditions change during acquisition of the entire image, the effects can be detrimental to the quality of the images obtained.

In image capture, a flash is often used to improve image quality by illuminating the scene with a burst or pulse of visible light while a frame of the scene is being captured. In an imaging device equipped with a rolling shutter, however, the flash can have adverse effects on the image quality due to the line by line processing technique. Indeed, since the duration of a flash may be short (typically of the order of tens to hundreds of µs) compared to the processing time of a frame (typically of the order of tens of ms) the different lines of sensors will be exposed in significantly different ways. This difference in exposures leads to effects such as partial lighting which impair the quality of the images obtained and to image distortions such as skew type effects. The impairment of image quality may be further aggravated in the case of the frame capture of fast moving objects leading to image artifacts such as skew effects.

The present invention has been devised with the foregoing in mind.

SUMMARY

According to a first aspect of the invention there is provided a method of obtaining a sequence of images of a scene using an electronic imaging device and a flash unit to illuminate the scene wherein the imaging device has a plurality of photosensitive cells arranged in an array to form a frame region, the frame region being composed of a plurality of frame sub-regions, each frame sub-region corresponding to a sub-set of the photosensitive cells each subset of photosensitive cells having an exposure time duration, wherein the exposure time duration of at least some of said image sub-regions occurs at different times during a total time of exposure of the frame region, the method comprising:

activating the flash unit to illuminate the scene to be imaged at a flash event delay set according to said exposure time duration of a subset of photosensitive cells and the time duration of the flash event;

acquiring a set of frames of the scene wherein the time of occurrence of a flash event within a frame shifts temporally from frame to frame; and constructing a sequence of images, each image being constructed from frame sub-regions of the acquired frames.

The control of flash illumination in this way helps to eliminate problems of intra-line distortion and the image quality is thus improved. The photosensitive cells may be photosites.

In an embodiment, the flash event delay is greater than or equal to the sum of the exposure time duration of a subset of photosensitive cells and the time duration of the flash event.

In one particular embodiment the flash event delay is equal to the sum of the exposure time duration of subset of photosensitive cells and the time duration of the flash event.

Preferably each frame sub-region corresponds to a line of photosensitive cells of the array and exposure of the array is performed successively line by line. A line may correspond to a row of photosensitive cells or a line of photosensitive cells.

In an embodiment the flash events are timed in such a way that each sub-set of photosensitive cells is illuminated by one flash event during capture of a frame.

In an embodiment the flash events are timed in such a way that each frame is illuminated by at least one flash event.

In an embodiment each image of the sequence of images is formed by reassembling the frame sub-regions of consecutive frames illuminated by the same flash event to form a reconstructed image. The reconstructed image may thus include frame sub-regions of different captured frames.

In an embodiment the method includes identifying frame sub regions for which the same flash event is shared between two consecutive frames and applying a weighted illumination intensity to said sub-regions to form the reconstructed image.

In an embodiment the time duration of the flash event is determined to be a fraction of the exposure time duration of a frame sub-region such that $$\text{Exposure}_{time} = n \times \text{flash}_{duration};$$

where n is an integer greater than 0.

In an embodiment the flash event duration changes from one frame to another frame and the flash delay is adjusted from frame to frame accordingly.

According to a second aspect of the invention there is provided an electronic imaging device having a plurality of photosensitive cells arranged in an array to form a frame region, the frame region being composed of a plurality of frame sub-regions each frame sub-region corresponding to a sub-set of photosensitive cells, the device comprising an array controller configured to expose each of said frame sub-regions during an exposure time duration wherein the exposure of at least some of said frame sub-regions occurs at different times during a total time of exposure of the frame region, a flash unit for illuminating a scene to be imaged during a flash time duration an activator for activating the flash unit to illuminate the scene to be imaged at a flash event delay determined in dependence upon said exposure time duration of a frame sub region and the flash time duration;

an image data acquisition unit for acquiring a set of frames of the scene wherein the time of occurrence of a flash event within a frame shifts temporally from frame to frame; and an image reconstruction unit for constructing a sequence of images from the frame sub-regions of the acquired frames.

In an embodiment, the flash event delay is greater than or equal to the sum of the exposure duration of a frame sub region and the duration of the flash event. Preferably the flash event delay is equal to the sum of the exposure duration of a frame sub region and the duration of the flash event.

In an embodiment, the flash events are timed such that each subset of photosensitive cells corresponding to a frame sub-region is flashed only once during capture of a frame.

In an embodiment, each image of the sequence of images is formed by reassembling the frame sub-regions of consecutive frames illuminated by the same flash event to form a reconstructed image In an embodiment, the image reconstruction unit is configured to identify sub regions for which the same flash event is shared between two consecutive frames and to apply a weighted illumination intensity to said frame sub-regions to form the reconstructed image.

In an embodiment the device includes a clock to synchronise operation of the array controller and the activator.

A further aspect of the invention relates to a method or device for controlling a flash unit such that during the acquisition of a frame each scan line of a frame is illuminated by only one flash event. Preferably, the flash event delay is greater than or equal to the sum of the exposure duration of subset of photosensitive cells and the duration of the flash event. The flash events may be timed such that at least one flash event occurs in each frame.

A further aspect of the invention provides a flash control device for an electronic imaging device, the electronic image device having a plurality of photosensitive cells arranged in an array to form a frame region, the frame region being composed of a plurality of frame sub-regions each frame sub-region corresponding to a sub-set of photosensitive cells, and being exposed during an exposure time duration wherein the exposure of at least some of said frame sub-regions occurs at different times during a total time of exposure of the frame region, the flash control device comprising an activator for activating a flash unit to illuminate the scene being imaged at a plurality of flash events, the time interval between consecutive flash events being set to shift temporally from frame to frame the time of occurrence of a flash event with respect to the start of a frame, the time interval being greater than or equal to the sum of the exposure time duration of a subset of photosensitive cells and the time duration of the flash event and the time duration of the flash event.

A further aspect of the invention provides a method of controlling a flash unit for an electronic imaging device, the electronic image device having a plurality of photosensitive cells arranged in an array to form a frame region, the frame region being composed of a plurality of frame sub-regions each frame sub-region corresponding to a sub-set of photosensitive cells, and being exposed during an exposure time duration wherein the exposure of at least some of said frame sub-regions occurs at different times during a total time of exposure of the frame region the method comprising activating the flash unit to illuminate the scene being imaged at a plurality of flash events, the time interval between consecutive flash events being set to shift temporally from frame to frame the time of occurrence of a flash event with respect to the start of a frame, the time interval between consecutive flash events being greater than or equal to the sum of the exposure time duration of a subset of photosensitive cells and the time duration of the flash event and the time duration of the flash event.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system'. Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RE signal.

BRIEF DESCRIPTION OF THE DRAWINGS

Embodiments of the invention will now be described, by way of example only, and with reference to the following drawings in which.

DETAILED DESCRIPTION

Figure 1:
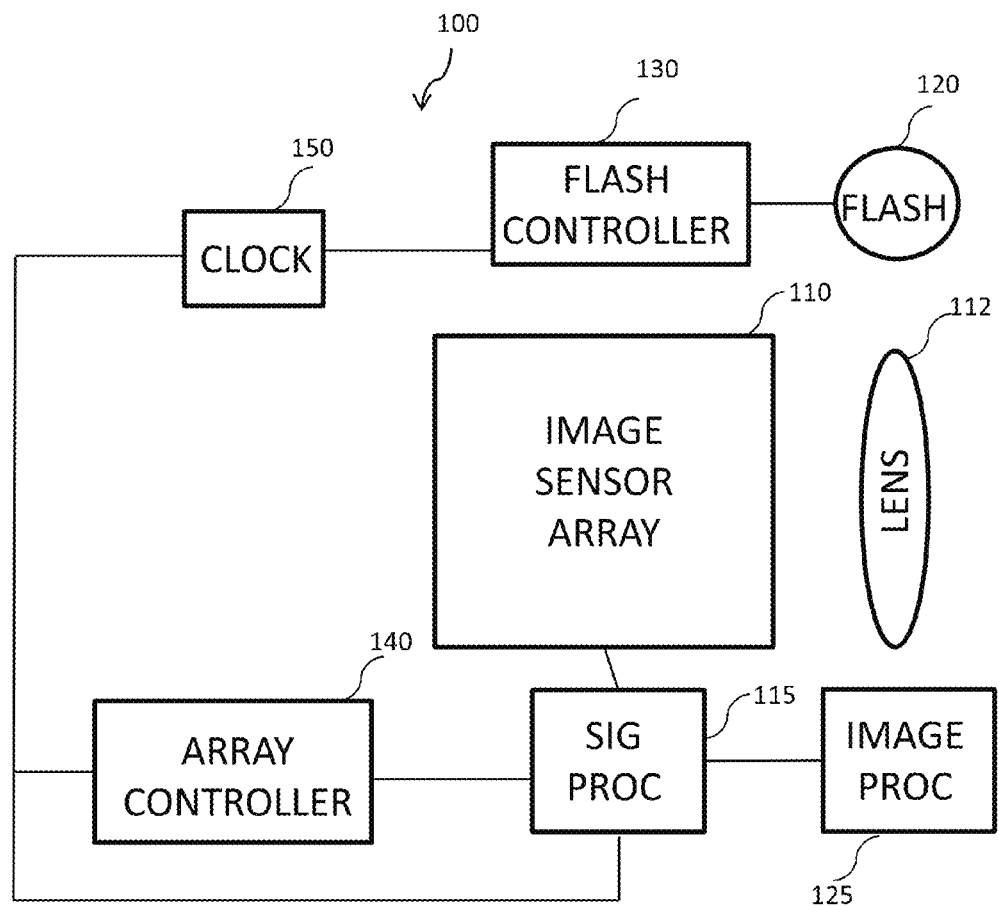
FIG. 1 is a block diagram illustrating components of an electronic imaging device in accordance with at least one embodiment of the invention.

FIG. 1 is a simplified functional block diagram illustrating components of an electronic imaging device in accordance with an embodiment of the invention. The electronic imaging device may be a dedicated camera such as a camcorder or professional studio camera for capturing a sequence of frames, or an imaging module of a multifunctional electronic device such as a mobile telephone, a smart phone, a personal digital assistant (PDA), or a portable computer such as, for example, a tablet computer, a laptop computer or a notebook computer.

The electronic imaging device 100 comprises an image sensor array 110 for capturing light from a scene, a lens 112 for guiding light to the sensor array 110, a signal processing unit 115 for processing signals from the sensor array 110, an image processing unit 125 for reconstructing images from the processed signals, a flash unit 120 for illuminating the scene to be captured, a flash controller 130 for controlling parameters of the flash unit 120, an array controller 140 for controlling the times of exposure of the photosites of the sensor array 110 to light from the scene and a clock 150 which may be used to provide timing synchronization of the various modules. It will be appreciated that in certain embodiments of the invention the flash controller 130 and the array controller 140 are not synchronized. In other embodiments the flash controller 130 and the array controller 140 are synchronized for increased timing accuracy between the time of occurrence of flash events and the exposure times of the lines.

It will be appreciated that the imaging device may be provided with further optical elements such as a variable aperture, a zoom mechanism or an autofocus mechanism to provide enhancement of the captured image.

Figure 2:
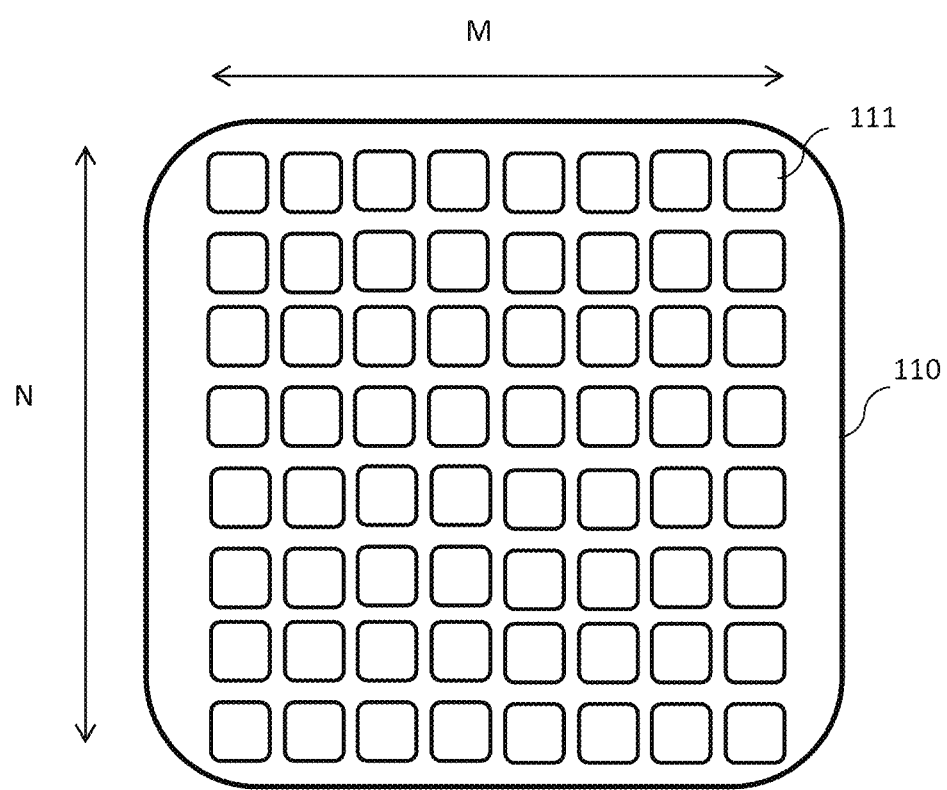
FIG. 2 is a schematic diagram of an image sensor array in accordance with an embodiment of the invention.

The sensor array 110 is composed of a set of photosensitive cells (photosites) 111 arranged in a bi-dimensional array of N rows and M columns as illustrated in FIG. 2. The bi-dimensional array 110 of photosites 111 corresponds to an image region of a rendered image of pixels. Each pixel of a rendered image may correspond to one or more of the photosites 111. Each photosite, in this exemplary embodiment, is a CMOS image sensor. When light hits the CMOS type photosite 111, the photosite 111 is charged with an electrical charge which is proportional to the amount of captured incoming light. The electrical charge signal is then processed by signal processing unit 115, for example it may be converted into a voltage signal to provide a pixel reading value. The signal processing performed may include amplification of the signal and conversion of an analog signal into a digital signal. The exposure time duration of a single photosite 111 corresponds to the duration of time during which the photosite integrates the electrical charge formed by the incident light. In practice, the exposure time duration or integration time corresponds to the time between the reset of a photosite in which the previous charge contained in the photosite is reset to zero by a reset function of the array controller 140 and ends when the charge is read from the photosite by a read function. Flash unit 120 includes a light source, such as, for example, one or more LEDs or Xenon type lights, for illuminating the scene to be imaged. Flash controller 130 controls parameters of the flash 120 including, the frequency of occurrence of the flash, the duration of the flash burst, and/or the intensity or amplitude of the flash burst. The array controller 140 generates various commands that are signaled to components of the imaging device 100 including the reset, integrate and readout commands to the image sensor array 110. The operations of resetting, integration and reading are performed for one line of the image array at a time, for example row by row i.e. all the photosites of a line are reset and read together. The signal processing unit 115 processes the signals read from the photosites 111 in response to exposure to the incoming light line by line. Images are reconstructed from the processed signals by image processing unit 125. In practice, the camera exposure time corresponds to the exposure time duration of a line of a captured frame.

Figure 3A:
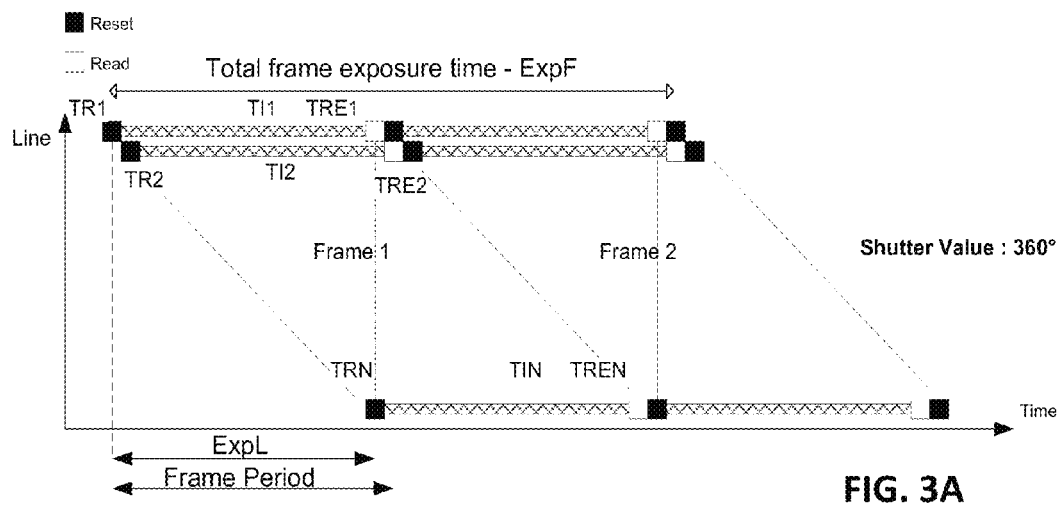
FIGS. 3A & 3B are graphical representations of examples of a rolling shutter technique.
Figure 3B:
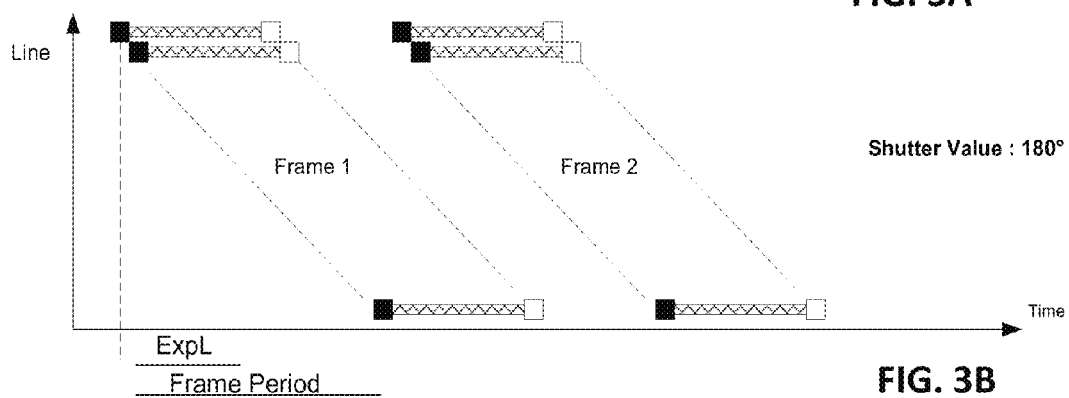

FIGS. 3A and 3B graphically illustrate examples of row by row processing for a 360° and a 180° shutter value, respectively. The exposure of the rows for charge collection is started by resetting the rows, one by one, with a reset function R controlled by array controller 140. For example with reference to FIG. 3A the photosites of the first row of frame 1 are reset at time TR1, exposed during time TI1 for the capture of light induced charge and the total charge of each pixel sensor of the row is read out at time TRE1, the photosites of the second row of frame 1 are reset at time TR2, exposed during time TI2 and read at time TRE2 and the last row of photosites of frame 1 are reset at time TRN, exposed during time TIN and read at time TREN. The duration of time between the reset functions of two successive rows is referred to as a row processing delay RP. The row processing delay RP may also correspond to the duration of time between the read functions of two successive rows.

As illustrated in FIGS. 3A and 3B since the rows are reset at different times, the actual time during which the exposure to incoming light takes place differs from row to row of the image sensor array 110. For example, while there is some overlap in the exposure time durations for rows 1 and 2, the exposure time duration ExpL of row 1 has finished by the time the exposure time duration of row N begins. The exposures of the different scan lines therefore take place at different times during a total frame exposure time ExpF. This row by row processing of the image area corresponding to the array of photosensitive sensors is referred to as a rolling shutter.

Figure 4:
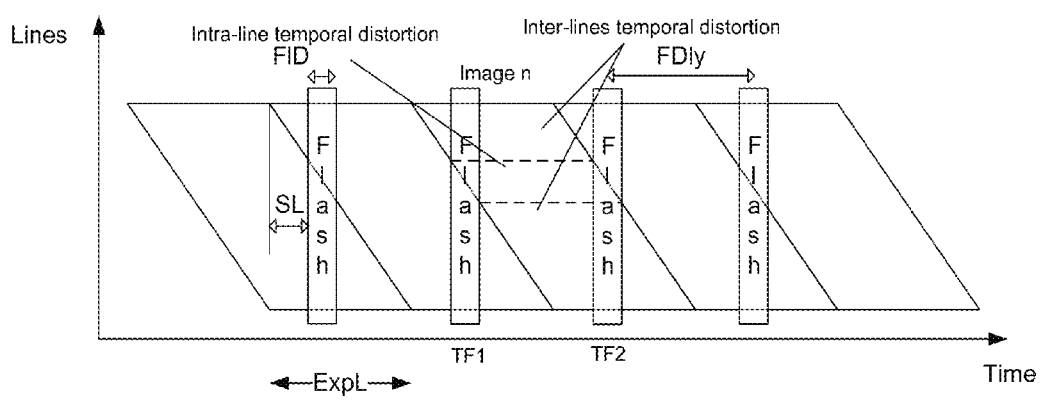
FIG. 4 is a graphical representation of an example of a rolling shutter technique using a flash.
Figure 5:
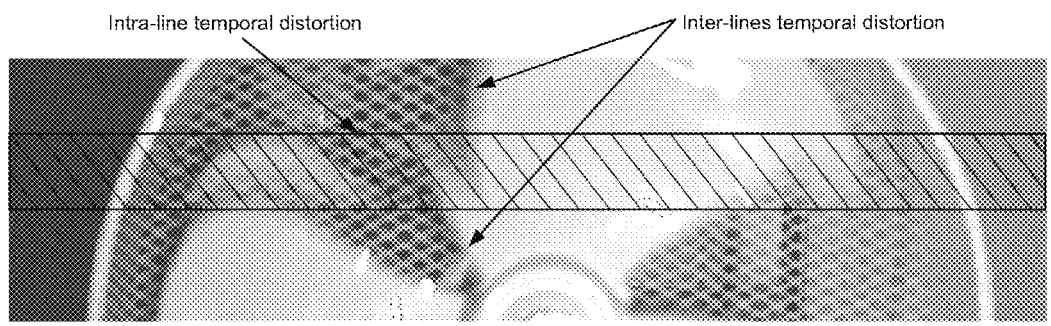
FIG. 5 is an example of an image acquired using the process of FIG. 4.

FIG. 4 graphically illustrates the use with a rolling shutter of a flash which flashes with a flash time delay FDly between flash event occurrences. In this example the flash time delay FDly corresponds to the exposure time duration ExpL of a row such that the flash event illuminates the scene for a flash duration FID at the same point of time within a frame, from frame to frame—i.e. the time delay SL between the start of frame acquisition and the time of flash occurrence does not change frame to frame. As illustrated, the first captured frame of the sequence of frames is illuminated by a flash event during the exposure times of the lower rows of the frame while the upper rows of the frame are not illuminated by the flash event during their preceding respective exposure times. In the third frame of the sequence some rows of the frame in the central region receive two separate flash illuminations at times TF1 and TF2 during their respective exposure times. Moreover, some of these central rows are partially flashed during a flash event, i.e. not flashed for the full flash duration FID of that same flash event. The same effect occurs in the preceding frame and the subsequent frame of the sequence. Any movement in the scene being imaged between times TF1 and TF2 may lead to temporal distortion in the acquired image including intra line temporal distortion and interline temporal distortion FIG. 5 is a captured image of a rotating blade of a ventilator fan. The captured image presents an example of the temporal distortion effects including intra-line and interline temporal distortion effects. Intra-line distortion is present in the captured scan lines located between the dashed lines. The moving blade of the fan is distorted. The interline effects is indicated by the arrows.

In embodiments of the invention the timing of the flash events is controlled to address such issues. In particular the flash time delay (FDly) between flash events (referred to herein as flash event delay (FDly)) is set so as not to be equal to a line exposure time (ExpL) such that there is a time shift S in the time of occurrence of a flash event within a frame, from frame to frame. In some particular embodiments of the invention the flash event delay (also referred to as a stroboscopic event delay in the case where a stroboscope is used) is determined taking into account the camera exposure time (i.e. the time duration of exposure of a line (ExpL)) and the time duration of the flash event such that the time of occurrence of a flash event within a frame is temporally shifted from frame to frame. The flash controller 130 is configured to activate the flash at a flash event delay in accordance with this temporal shift. In one particular embodiment the flash event delay is based on the sum of the time duration of the exposure of a line and the time duration of the flash event such that:

$$\text{Delay}_{flash} \geq \text{Camera Exposure}_{duration} + \text{Flash}_{duration} \quad (1)$$

In one particular embodiment the flash event delay is based on the sum of the time duration of the exposure of a line and the time duration of the flash event such that:

$$\text{Delay}_{flash} = \text{Camera Exposure}_{duration} + \text{Flash}_{duration} \quad (2)$$

For example if the exposure time duration of a scan line is 20 ms corresponding to a camera frequency of 50 Hz and the flash event duration is 2 ms, the flash event delay (FDly) between camera flash events will be 22 ms i.e. the flash frequency will be 45.45 Hz.

Figure 6:
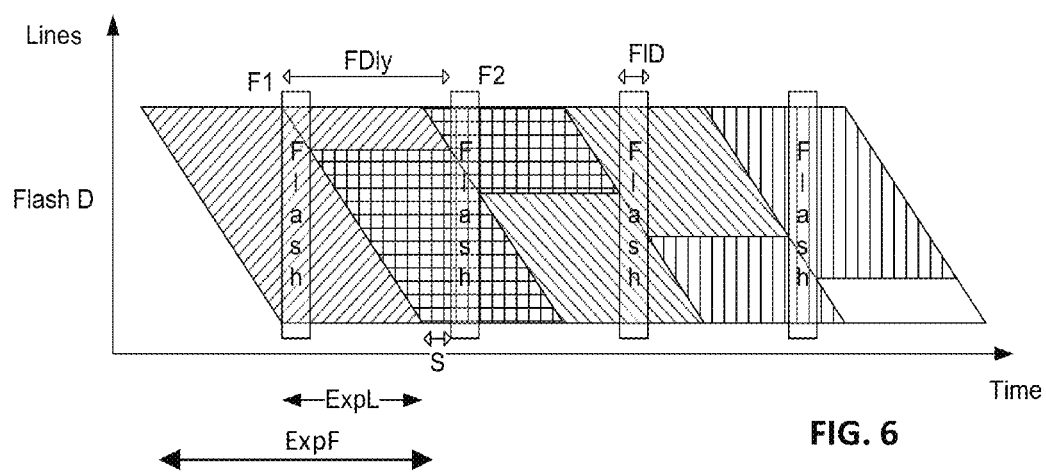
FIG. 6 is a graphical representation of an example of a rolling shutter technique using a flash in accordance with an embodiment of the invention.

An example of a flash control procedure in accordance with an embodiment of the invention is graphically illustrated in FIG. 6. In this particular embodiment the flash event delay FDly is set to the sum of the time duration of the exposure of a line ExpL and the time duration of the flash event FID. In this example, the start of the first flash event F1 occurs at the start of exposure of the last row N of photosites 111 of during the first frame. As depicted in FIG. 6, the same flash event F1 occurs during exposure of the initial rows of the image sensor array during the first frame and the second frame—i.e. the flash duration FID of the flash event covers the end of exposure of a line of photosites 111 in the first frame and the beginning of exposure of the same line of photosites 111 in the subsequent second frame. In Frame 2, following Frame 1, the second flash event F2 occurs at a different relative time within the frame by a time shift S—in this example, after exposure of the last line of photosites 111 has started. In this example the time shift S is substantially equal to the flash event duration FID. Each flash event has a flash duration FID. It can be seen that, during the capture of the sequence of frames the flash does not illuminate the same row of photosites 111 twice within one frame acquisition time, i.e. each line of an image acquired during a frame has a single flash event occurrence during that frame. As a result any intra-line distortion is prevented.

Post processing on captured frames of a video sequence is then performed by imaging processing unit 125 to reconstruct a set of images from the data read out from the scan lines of the captured sequence of frames. Image regions of consecutive captured frames which share the same flash event are identified so that an image can be reconstructed from image regions sharing the same flash event. During reconstruction of an image, lines of the video sequence of frames that are temporally concordant to share a flash event are reassembled to form an image. In FIG. 6, for example, each image region around a flash event occurrence, indicated by the same hatched pattern represents all the scan lines that are illuminated by the same flash event. Reassembling lines of the same flash event occurrence enables an image to be obtained in which temporal distortion effects are minimised.

For a video sequence of captured frames as illustrated in FIG. 6, the output frequency of the reconstructed images is equal to the frequency of the flash. For example if the exposure time is 20 ms corresponding to a camera frequency of 50 Hz and the flash duration is 2 ms, the flash event delay between camera flash events will be 22 ms (i.e. the flash frequency will be 45.45 Hz) and the output sequence will be rendered at a frequency corresponding to the flash frequency of 45.45 Hz.

Figure 7:
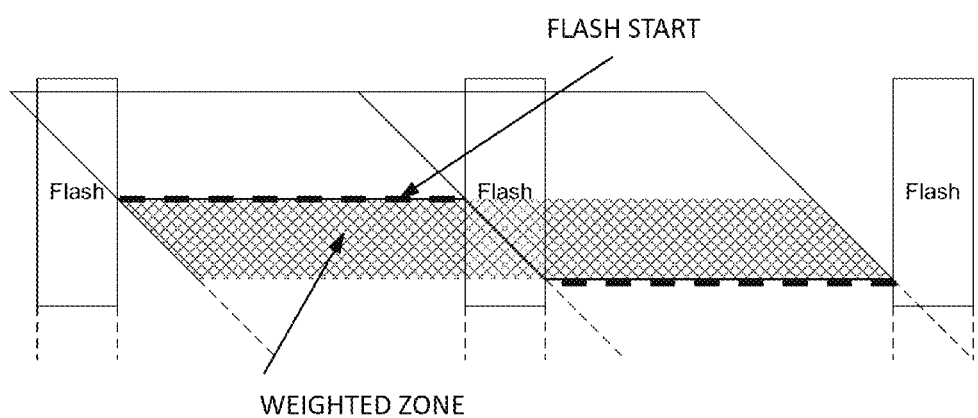
FIG. 7 is a graphical representation of an example of a rolling shutter technique using a flash in accordance with an embodiment of the invention in which image sub-regions belonging to the same flash event are identified.

FIG. 7 graphically illustrates the image regions of two consecutive frames corresponding to a single flash event. The dotted lines define the beginning and the end boundaries of the single flash event occurrence in terms of lines of the image sensor array. In the hatched area, illumination from the single flash event has been distributed between two consecutive frames. Consequently, during image reconstruction, a reconstructed image is recomposed from the lines of both frames corresponding to this image region, by applying a suitable weighting function to the said overlapping lines. The weighting function used may be determined in dependence upon the lighting conditions and the camera used.

Figure 8:
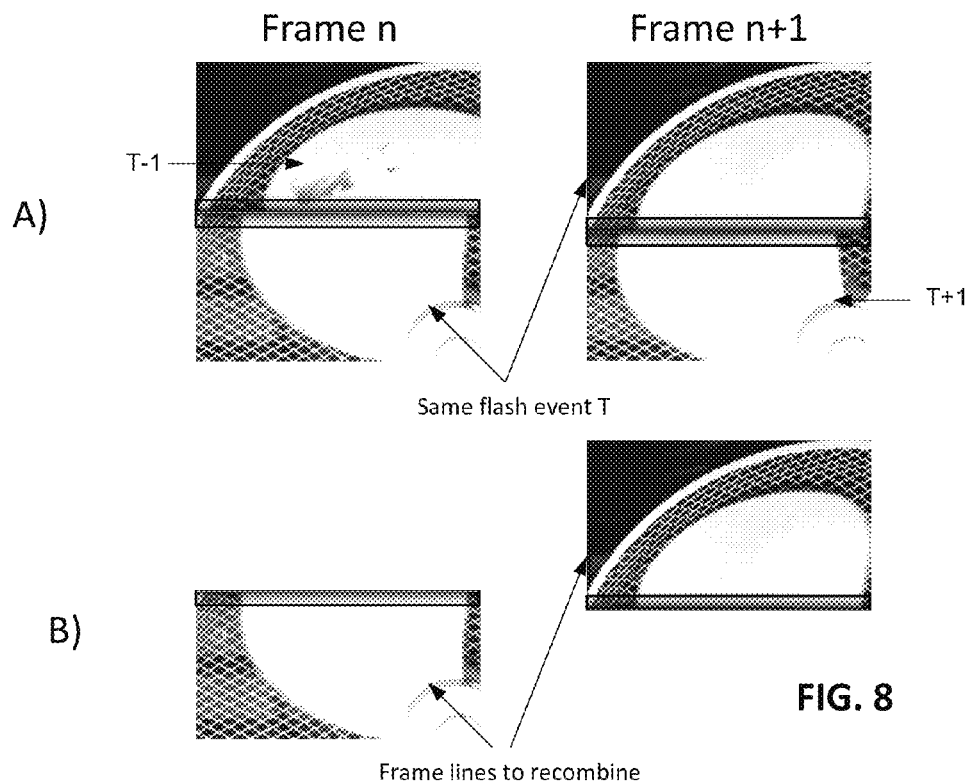
FIGS. 8 & 9 are example of consecutive acquired frames and a reconstructed image in accordance with an embodiment of the invention.
Figure 9:
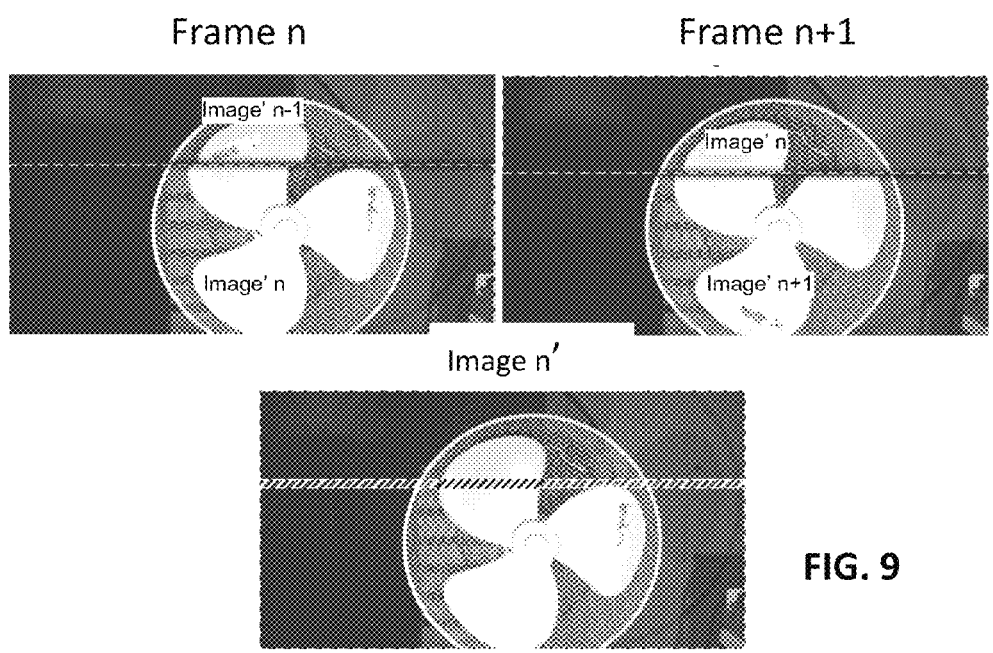

FIG. 8 depicts captured frames of a scene of a rotating ventilator blade. Lines of frame n and consecutive frame n+1 corresponding to the same flash event occurrence T are indicated in FIG. 8A. FIG. 8B illustrates how lines from frame n and lines acquired from frame n+1 are reassembled to form a reconstructed image based on one flash event occurrence T. The upper lines of frame n+1 are reassembled with the lower lines of frame n to form a recomposed image n'. Examples of an image n' reconstructed from the lines of frames n and n+1 corresponding to a single flash event are illustrated in FIG. 9. A weighting function is applied to the overlapping lines from the first and second frame.

In one particular embodiment of the invention an Avisynth filter is used to recompose an image from lines of consecutive frames sharing the same flash event. Consecutive frames of a video sequence captured using a flash activated at a frequency determined in accordance with an embodiment of the invention are input into the filter. The filter reads through two consecutive frames sharing the same flash event to identify lines having the lowest light intensity i.e. lines of a captured frame where the same flash event is shared with that captured frame and at least one adjacent subsequent frame. Once such lines have been identified a reconstruction of an output image is performed. The lines identified as having the lowest light intensity are processed in a different way to the remaining lines of the consecutive frames sharing the same flash event. For example, with reference to the acquired frames of FIG. 8 lower lines of frame n are recomposed with upper lines of frame n+1 to form part of the image n'. The lines in each frame having the lowest light intensity are identified—this corresponds to the lines where the duration of the flash event is shared between the two frames. For the identified lines of lowest light intensity, the remaining part of image n' is then reconstructed by applying suitable weighting to the identified lines of both frames to form a single set of weighted lines for the remaining part of the reconstructed image n', which in the example of FIG. 8 are the central lines of the image n'.

It may be noted that the weighting function is linear when the image is in the raw space. This means that if a gamma correction has been applied, the image should be converted back to the linear space before performing the recomposition and then gamma correction is reapplied to the recomposed image. In such conditions and for the central overlapping region between the two frames a simple addition of color values of pixels of frame i−1 and frame i is sufficient.

In the source frames a gradient is logically present in one direction for the first frame and in another direction for the second frame. A gradient is highly dependent on the gamma LUT (look up table) taken to output the image.

Figure 10:
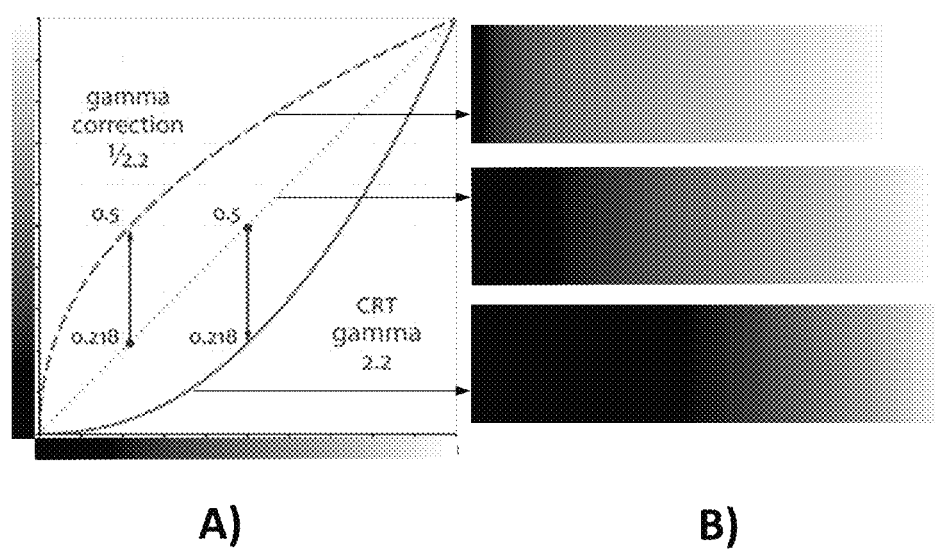
FIG. 10 illustrates examples of gamma correction functions that may be applied in embodiments of the invention.

FIG. 10A is a graphical representation of a linear gamma function, a gamma 2.2 and a gamma 0.45. If the gamma function is linear then the reconstitution is a simple addition of the pixels of the two frames. If there is any gamma correction, an un-gamma correction is applied prior to image reconstruction. As an example a Sony F65 viewer software provides several output options in terms of Gamma (but not linear gamma). As an example a gamma 2.2 is selected, then a gamma 0.45 function is applied before recomposing the images to put the images into linear space.

Figure 11:
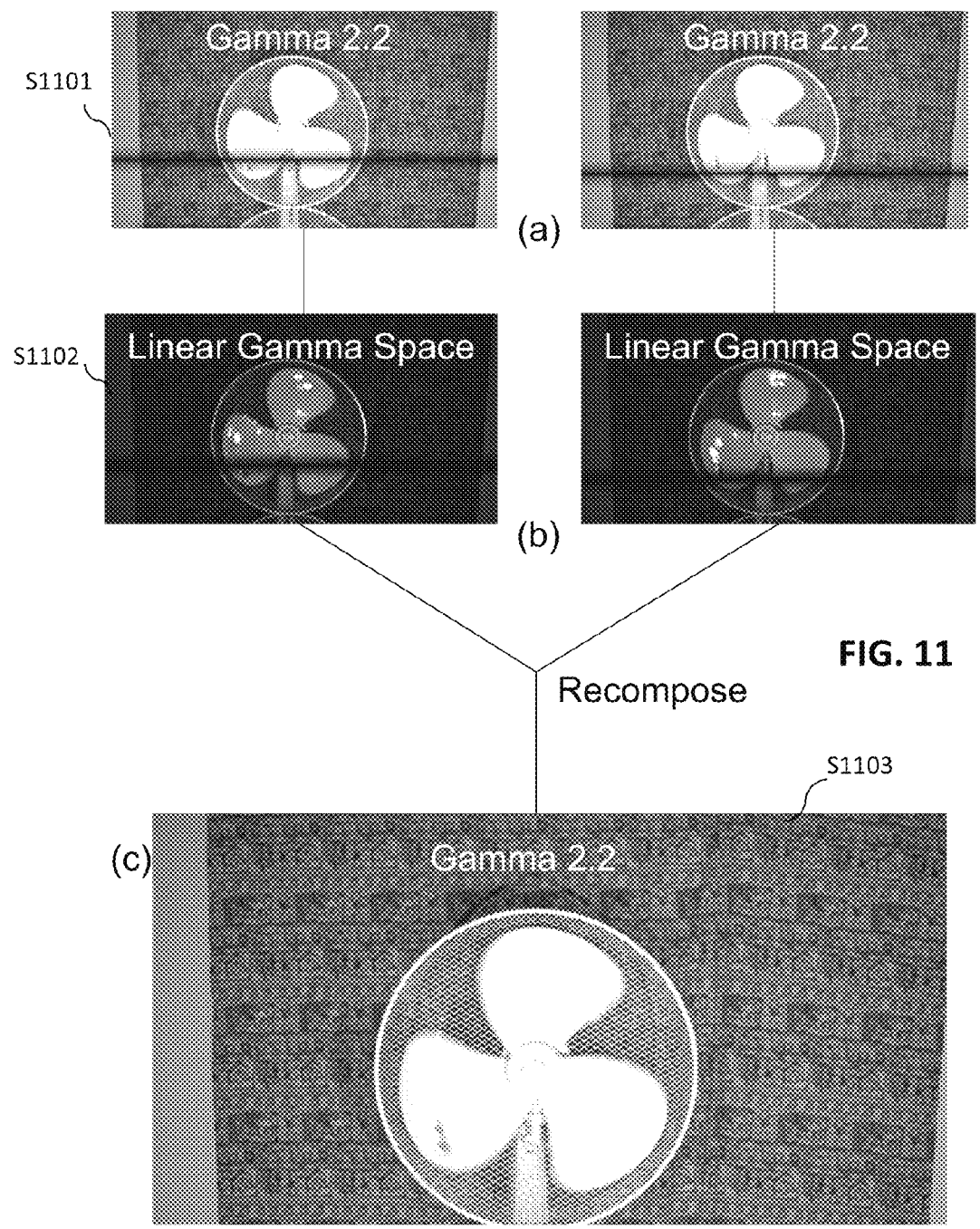
FIG. 11 illustrates steps of image processing applied in accordance with an embodiment of the invention.

Exemplary image recomposition steps are shown in FIG. 11. In step S1101 the consecutive frames sharing the same flash event are provided. A gamma 2.2 correction function has been applied to these frames. In step S1102 the gamma 2.2 corrected frames are converted into a linear gamma space by applying a gamma 0.45 correction function. The lines of the converted frames are recombined to form a recombined image as previously described and a gamma 2.2 correction is applied to form a recomposed gamma 2.2 image in step S1103.

Figure 12:
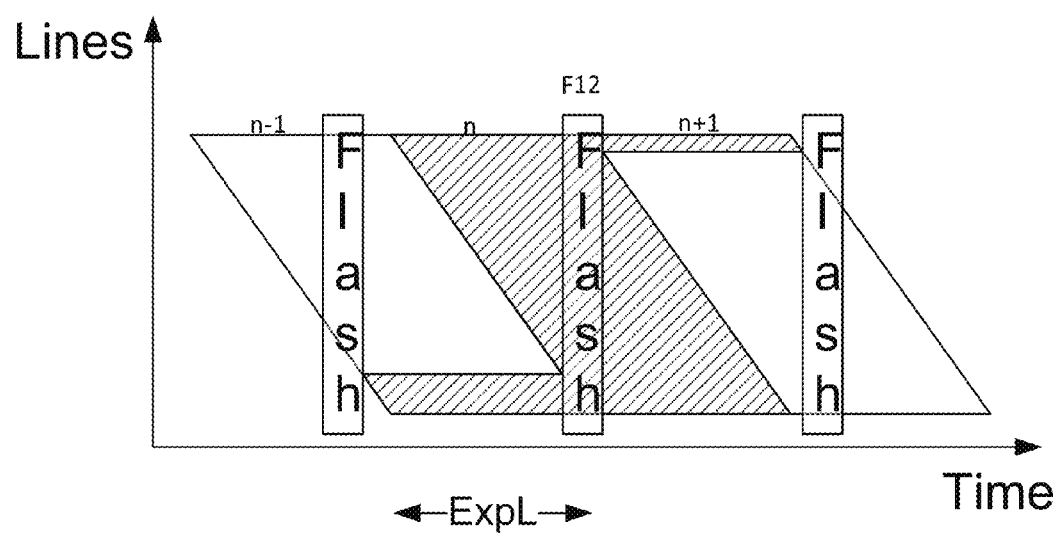
FIG. 12 is a graphical representation of an example of a rolling shutter technique using a flash in accordance with an embodiment of the invention.

While FIG. 6 illustrates a specific example in which a flash event illuminates only two consecutive frames, it will be appreciated that in other embodiments of the event a flash event could be shared over three or more consecutive frames, as illustrated for example in FIG. 12. If, within a first captured frame, a flash event occurs at the end of the exposure of the last line, in a second consecutive frame the same flash event is common to all lines of the second consecutive frame and then the same flash event is shared with the initial lines of a third consecutive frame a single image may be reconstructed from the three consecutive frames. In FIG. 12 the hatched areas identify the lines associated with Flash Event F12 to be recombined to form an image. The lines include the last lines of frame n−1, all the lines of frame n, and the initial lines of frame n+1. A method of image reconstruction as described for lines of two consecutive may be applied with weighting being applied to lines of overlapping image regions of the recombined image.

In some embodiments of the invention, in order to avoid a flash event being associated with lines of more than two captured frames, the duration of the flash pulse or burst is determined to be a fraction of the line exposure time such that $$\text{Exposure}_{time} = n \times \text{flash}_{duration};$$

where n is an integer greater than 0.

If the flash event duration is set in this way, in each frame the end of the flash event occurs at the end of the exposure of the last line of a captured frame.

Figure 13:
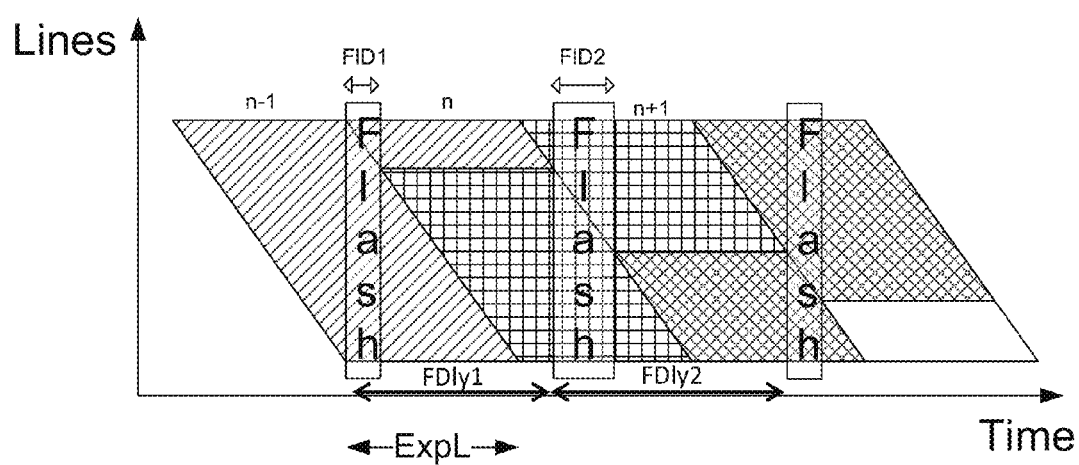
FIG. 13 is a graphical representation of another example of a rolling shutter technique using a flash in accordance with an embodiment of the invention.

While FIG. 6 illustrates a specific example, in which the duration of a flash event does not change from frame to frame, in other embodiments of the invention the time duration of the flash event may change from one frame to another and the flash event delay between flash event occurrences will change accordingly. With reference to FIG. 13, for example, the time duration FID2 of the second flash burst is greater than the time duration FID1 of the first flash burst. The durations of the flash bursts may differ from frame to frame in order to provide different lighting conditions during frame capture. Since the flash time delay between flash events is dependent on the duration of the flash in accordance with equation (1) or (2) the flash time delay will change accordingly. Thus the time delay FDly1 between flash events FI1 and FI2 is less than the time delay FDly2 between flash events FI2 and FI3. Dynamic adaptation to changes in flash conditions is thus provided.

Figure 14:
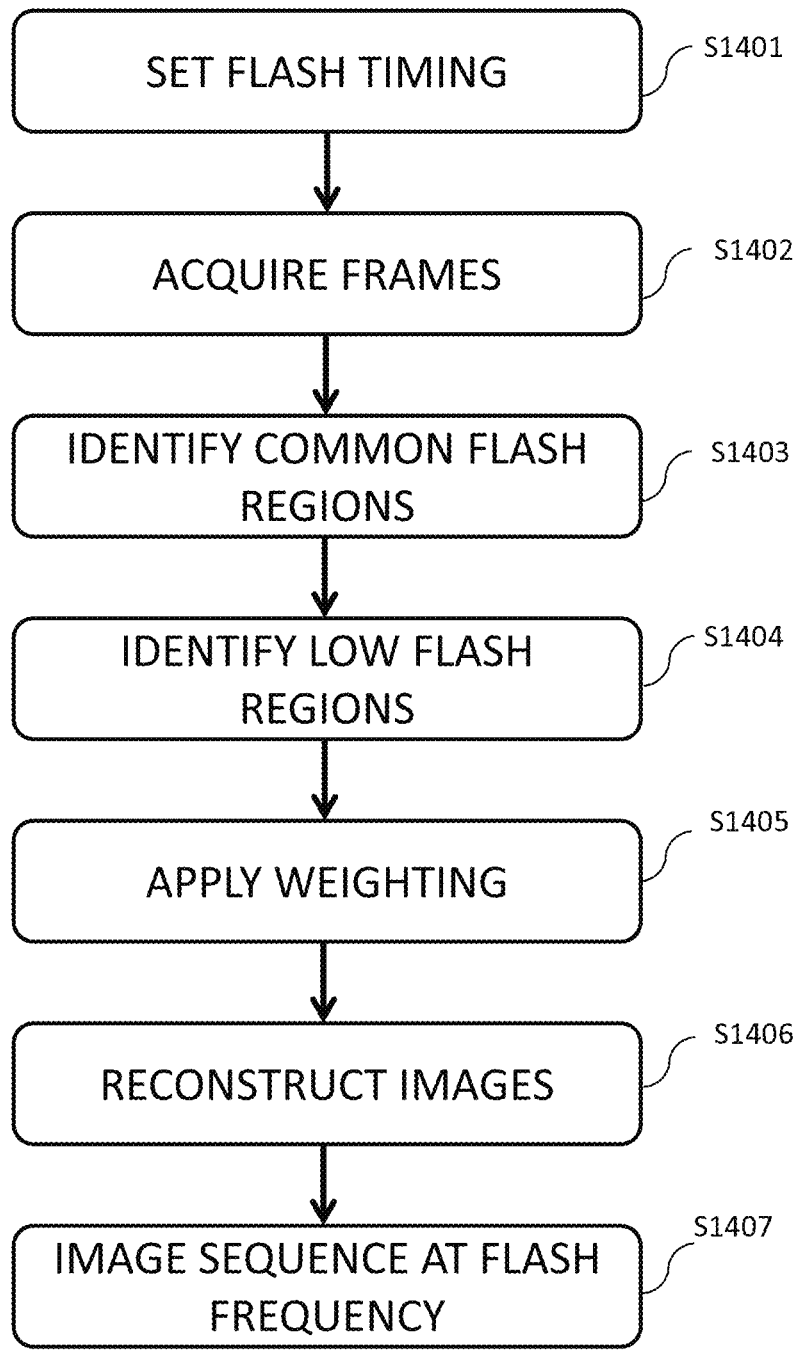
FIG. 14 is a flow chart illustrating steps of a method of obtaining a sequence of images in accordance with an embodiment of the invention.

FIG. 14 is a flow chart illustrating steps of a method of obtaining a sequence of images illuminated by a flash in accordance with one or more embodiments of the invention. In step S1401 the timing of flash activation is set in accordance with the camera exposure time and the time duration of the flash such that:

$$\text{Delay}_{flash} \geq \text{Camera Exposure}_{duration} + \text{Flash}_{duration}$$

In step S1402 a set of frames of a scene is acquired with the flash being activated according to the determined flash timing to illuminate the scene. In step S1403 acquired consecutive frames are processed in order to determine regions of the frames associated with the same flash event. Lines within the consecutive frames having low light intensity are identified in step S1404 in order to identify regions to which a weighting function will be applied in step S1405 for reconstruction of the image from the identified frame regions. In step S1406 the identified frame regions including the weighted frame regions are combined to form a reconstructed image related to a single flash event. A sequence of images is formed in this way and rendered in step S1407 at a frequency dependent on the determined flash event delay.

Embodiments of the invention described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, tablets, cell phones, portable/personal digital assistants ("PDAs"), and other devices that facilitate communication of information between end-users.

The modules of FIG. 1 correspond to functional units, which may or may not relate to distinguishable physical units. For example, these modules or some of them may be combined in a unique component or circuit, or correspond to a software functionality. Moreover, it will be appreciated that some modules may potentially be composed of separate physical entities.

Reference to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

Additionally, this application or its claims may refer to "determining" various pieces of information. Determining the information may include one or more of, for example, estimating the information, calculating the information, predicting the information, or retrieving the information from memory.

Additionally, this application or its claims may refer to "receiving" various pieces of information. Receiving is, as with "accessing", intended to be a broad term. Receiving the information may include one or more of, for example, accessing the information, or retrieving the information (for example, from memory). Further, "receiving" is typically involved, in one way or another, during operations such as, for example, storing the information, processing the information, transmitting the information, moving the information, copying the information, erasing the information, calculating the information, determining the information, predicting the information, or estimating the information.

As will be evident to one of skill in the art, implementations may produce a variety of signals formatted to carry information that may be, for example, stored or transmitted. The information may include, for example, instructions for performing a method, or data produced by one of the described implementations.

Although the present invention has been described hereinabove with reference to specific embodiments, the present invention is not limited to the specific embodiments, and modifications will be apparent to a skilled person in the art which lie within the scope of the present invention.

For instance, while the foregoing examples have been described with respect to a digital imaging device based on CMOS technology it will be appreciated that the invention may be applied to any light capturing technology.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

The invention claimed is:

1. A method of obtaining a sequence of images of a scene via an imaging device having a plurality of photosensitive cells arranged in an array to form a frame region, the frame region being composed of a plurality of frame sub-regions, each frame sub-region corresponding to a sub-set of the photosensitive cells each sub-set of photosensitive cells having an exposure time duration, wherein the exposure of at least some of said frame sub-regions occurs at different times during a total time of exposure of the frame region, the method comprising:
   illuminating the scene being imaged at a plurality of flash events;
   acquiring a set of frames of the scene; and
   constructing a sequence of images, each image being constructed from frame sub-regions of at least two acquired frames;
   wherein the time interval between consecutive flash events is set, so as to shift temporally from frame to frame the time of occurrence of a flash event with respect to the start of a frame, the time interval being set to be greater than or equal to the sum of the exposure time duration of a subset of the plurality of photosensitive cells and the time duration of the flash event.

2. The method according to claim 1, wherein each frame sub-region corresponds to a line of photosensitive cells of the array and exposure of the array is performed successively line by line.

3. The method according to claim 1, wherein the flash events are timed such that each sub-set of photosensitive cells is illuminated by one flash event during capture of a frame.

4. The method according to claim 1, wherein each image is constructed from frame sub-regions of at least two acquired frames.

5. The method according to claim 1, wherein each image of the sequence of images is formed by reassembling the frame sub-regions of consecutive frames illuminated by the same flash event to form a reconstructed image.

6. The method according to claim 5, comprising identifying frame sub regions for which the same flash event is shared between two consecutive frames and applying a weighted illumination intensity to said frame sub-regions to form the reconstructed image.

7. The method according to claim 1, wherein the time duration of the flash event is determined to be a fraction of the exposure time duration of a frame sub-region such that:

$$\text{Exposure}_{time} = n \times \text{flash}_{duration}$$

where n is an integer greater than 0.

8. The method according to claim 1, wherein the flash event duration changes from one frame to another frame and the flash interval is adjusted from frame to frame accordingly.

9. A non-transitory computer-readable medium having one or more executable instructions stored thereon, which when executed by a processor cause the processor to perform a method for obtaining a sequence of images of a scene via an imaging device having a plurality of photosensitive cells arranged in an array to form a frame region, wherein the frame region is composed of a plurality of frame sub-regions, each frame sub-region corresponding to a subset of the photosensitive cells each sub-set of photosensitive cells having an exposure time duration, and wherein the exposure of at least some of said frame sub-regions occurs at different times during a total time of exposure of the frame region, the method comprising:

illuminating the scene being imaged at a plurality of flash events;

acquiring a set of frames of the scene; and constructing a sequence of images, each image being constructed from frame sub-regions of at least two acquired frames;

wherein the time interval between consecutive flash events is set, so as to shift temporally from frame to frame the time of occurrence of a flash event with respect to the start of a frame, the time interval being set to be greater than or equal to the sum of the exposure time duration of a subset of the plurality of photosensitive cells and the time duration of the flash event.

10. An electronic imaging device having a plurality of photosensitive cells arranged in an array to form a frame region, the frame region being composed of a plurality of frame sub-regions each frame sub-region corresponding to a sub-set of photosensitive cells, the device comprising:

an array controller configured to expose each of said frame sub-regions during an exposure time duration wherein the exposure of at least some of said frame sub-regions occurs at different times during a total time of exposure of the frame region;

a flash unit for illuminating a scene to be imaged during a flash time duration;

a flash controller for activating the flash unit to illuminate the scene being imaged at a plurality of flash events, the time interval between consecutive flash events being set to be greater than or equal to the sum of the exposure time duration of a subset of the plurality of photosensitive cells and the time duration of the flash event;

a processor configured to:

acquire a set of frames of the scene wherein the time of occurrence of a flash event with respect to the start of a frame is shifted temporally from frame to frame; and construct a sequence of images from the frame sub-regions of the acquired frames.

11. The device according to claim 10, wherein the flash events are timed such that each subset of photosensitive cells is flashed only once during capture of a frame.

12. The device according to claim 10, wherein each image is constructed from frame sub-regions of at least two acquired frames.

13. The device according to claim 10, wherein each image of the sequence of images is formed by reassembling the frame sub-regions of consecutive frames illuminated by the same flash event to form a reconstructed image.

14. The device according to claim 13, wherein the processor is configured to identify sub regions for which the same flash event is shared between two consecutive frames and to apply a weighted illumination intensity to said frame sub-regions to form the reconstructed image.

15. The device according to claim 10, further comprising a clock to synchronise operation of the array controller and the flash controller.

16. A flash control device for an electronic imaging device, the electronic image device having a plurality of photosensitive cells arranged in an array to form a frame region, the frame region being composed of a plurality of frame sub-regions each frame sub-region corresponding to a sub-set of photosensitive cells, and being exposed during an exposure time duration wherein the exposure of at least some of said frame sub-regions occurs at different times during a total time of exposure of the frame region, the flash control device comprising:

a flash controller for activating a flash unit to illuminate the scene being imaged at a plurality of flash events, the time interval between consecutive flash events being set to shift temporally from frame to frame the time of occurrence of a flash event with respect to the start of a frame, the time interval between consecutive flash events being greater than or equal to the sum of the exposure time duration of a subset of photosensitive cells and the time duration of the flash event.

17. A method of controlling a flash unit for an electronic imaging device, the electronic image device having a plurality of photosensitive cells arranged in an array to form a frame region, the frame region being composed of a plurality of frame sub-regions each frame sub-region corresponding to a sub-set of photosensitive cells, and being exposed during an exposure time duration wherein the exposure of at least some of said frame sub-regions occurs at different times during a total time of exposure of the frame region, the method comprising activating the flash unit to illuminate the scene being imaged at a plurality of flash events, the time interval between consecutive flash events being set to shift temporally from frame to frame the time of occurrence of a flash event with respect to the start of a frame, the time interval between consecutive flash events being greater than or equal to the sum of the exposure time duration of a subset of photosensitive cells and the time duration of the flash event.

18. A method of obtaining a sequence of images of a scene via an imaging device having a plurality of photosensitive cells arranged in an array to form a frame region, the frame region being composed of a plurality of frame sub-regions, each frame sub-region corresponding to a sub-set of the photosensitive cells each sub-set of photosensitive cells having an exposure time duration, wherein the exposure of at least some of said frame sub-regions occurs at different times during a total time of exposure of the frame region, the method comprising:

the scene being imaged receiving an illumination at a plurality of flash events;

acquiring a set of frames of the scene; and constructing a sequence of images, each image being constructed from frame sub-regions of at least two acquired frames;

wherein the time interval between consecutive flash events is set, so as to shift temporally from frame to frame the time of occurrence of a flash event with respect to the start of a frame, the time interval being set to be greater than or equal to the sum of the exposure time duration of a subset of the plurality of photosensitive cells and the time duration of the flash event.

19. An electronic imaging device having a plurality of photosensitive cells arranged in an array to form a frame region, the frame region being composed of a plurality of frame sub-regions each frame sub-region corresponding to a sub-set of photosensitive cells, the device comprising:

an array controller configured to expose each of said frame sub-regions during an exposure time duration wherein the exposure of at least some of said frame sub-regions occurs at different times during a total time of exposure of the frame region;

a scene to be imaged receiving an illumination from a flash unit during a flash time duration;

a flash controller for activating the flash unit to illuminate the scene being imaged at a plurality of flash events, the time interval between consecutive flash events being set to be greater than or equal to the sum of the exposure time duration of a subset of the plurality of photosensitive cells and the time duration of the flash event; and a processor configured to:

acquire a set of frames of the scene wherein the time of occurrence of a flash event with respect to the start of a frame is shifted temporally from frame to frame; and construct a sequence of images from the frame sub-regions of the acquired frames.

\* \* \* \* \*